United States Patent [19]

Ullmann et al.

[11] 4,095,079
[45] June 13, 1978

[54] TOOL HOLDER FOR A SPARK EROSION MACHINE TOOL

[75] Inventors: Werner Ullmann, Locarno; Paul Fricker, Losone; Maurice Guenin, La Chaux-de-Fonds, all of Switzerland

[73] Assignee: A.G. für industrielle Elektronik AGIE Losone b. Locarno, Losone, Switzerland

[21] Appl. No.: 749,872

[22] Filed: Dec. 13, 1976

[30] Foreign Application Priority Data

Aug. 6, 1976 Germany ............................ 2635520

[51] Int. Cl.² .............................................. B23P 1/08
[52] U.S. Cl. ................................ 219/69 E; 219/69 V; 308/3 A; 308/6 R
[58] Field of Search ................. 219/69 E, 69 R, 69 V, 219/158; 308/6 R, 3 R, 3 A

[56] References Cited

U.S. PATENT DOCUMENTS

| 2,342,946 | 2/1944 | Tourneau | 308/3 R |
| 2,918,333 | 12/1959 | Friedman | 308/6 R |
| 3,353,875 | 11/1967 | Kange | 308/6 R |
| 3,363,083 | 1/1968 | O'Conner | 219/69 E |
| 3,389,625 | 6/1968 | Wagner | 308/6 R |

*Primary Examiner*—Bruce A. Reynolds
*Attorney, Agent, or Firm*—Flynn & Frishauf

[57] ABSTRACT

An assembly such as a tool head for a spark erosion profiling machine tool comprises an elongate tool holding member having first and second opposed lengthwise bearing surfaces and third and fourth opposed lengthwise bearing surfaces. By way of example the member can be square, the bearing surfaces then being the four long sides of the member. The member is partly housed in a housing wherein there are mounted bearings which support the member for movement in the direction of its length with respect to the housing. The bearings can comprise discrete circulating roller bearing shoes and they are in abutting contact with the member at five positions in the region of each of two planes spaced apart along the length of the member by a calculated optimum distance. In each plane, two of the abutting contact positions are on the first bearing surface, one is on the second surface, and the other two are on respective ones of the third and fourth surfaces in the region of a plane which is about midway between the first and second surfaces. The housing can be in one piece or it can comprise a part having a base and side walls defining a channel, and a part forming a cover for the mouth of the channel.

10 Claims, 7 Drawing Figures

TOOL HOLDER FOR A SPARK EROSION MACHINE TOOL

The invention relates to a holding assembly, for example a tool holder, for use in a machine tool such as a spark erosion machine.

BACKGROUND AND PRIOR ART

A spark erosion profiling machine tool may comprise a fixed workpiece holding means and a tool head which comprises an elongate tool holding member and means for linearly moving the tool holding member in the direction of its length so that a tool attached to the forward end of the member moves in relation to the workpiece and executes the machining process.

The accuracy of movement of the tool has an important effect on the accuracy, stability and quality of the machining process and so the tool holding member must be supported in the tool head of the machine in such a way that its linear movement is guided with a high degree of accuracy. In addition, the member should have a high degree of rigidity and resistance to torsional and bending moments which may be exerted on it during the machining process, for example due to the interaction of the tool and the flushing fluid which is used in spark erosion machining, especially when the movement of the tool includes a reciprocating component to assist the flushing effect.

Tool holding members of the relevant kind have hitherto generally been made of circular cross-section and have either been directly mounted in say a hydraulic cylinder forming the means for moving the member, or have been guided by means of linear bearings comprising live rolling elements. To resist torsional moments, additional structures have been used, for example a round or prismatic guide member mounted off-centre in relation to the axis of the holding member, or chamfering of the holding member or some part thereof and the provision of a correspondingly shaped fixed part which co-operates with the chamfered part to resist torsion.

Some tool holders comprise two or more round guide members which automatically resist torsional moments applied thereto. This, however, involves additional cost and problems regarding aligning the assembly.

There are known prismatic spark erosion tool holding members of various cross-sectional forms which are mounted in plain bearings or in live roller bearings, for example needle slide bearings. Plain bearings are subject to known problems, for example they can be made or adjusted to have very small clearances in which case the friction becomes high or, if the clearances are made larger to reduce friction, the play and "back-lash" of the tool holding member becomes unacceptably high for the present purpose. In addition, such bearings wear too quickly and are subject to "stick-slip" during slow movement (which is often required during spark erosion machining, for example for finishing operations). Live roller bearings are much better than plain bearings in regard to the above matters, i.e. they have much lower friction ratios for a given rigidity of the tool holding member. However they are attended by the additional problem that, due to the fact that the rolling elements are "live", i.e. they move with the tool holder, the length of the housing or the like forming the counter member of the assembly, i.e. the member between which and the tool holding member the rolling elements are interposed, has to be substantial in relation to the stroke of the tool holding member. In addition, only a limited and constantly varying distance between bearings is obtained which puts an upper limit on the rigidity of the tool holding member in the bearing, which rigidity is in any case not constant for all positions of the tool holding member over the length of its stroke.

OBJECTS OF THE INVENTION

The object of the invention is to enable there to be constructed a tool holder wherein the movement of the tool holding member is accurately guided and the member is substantially resistant to movement due to transverse and torsional stress, and in which the tool holder can have a longer stroke than hitherto in relation to the length of the housing or like member forming the countermember of the bearing assembly.

A further object is to provide a tool holder of relatively simple construction and comprising members having such shapes that they can be relatively easily and accurately machined or re-machined by nonspecialist machine tools, hence facilitating customer servicing of the holder.

DESCRIPTION OF THE INVENTION

The tool holder of the spark erosion machine tool to hold a device comprises:

an elongate member comprising portions defining first, second, third and fourth external bearing surfaces of the member, which bearing surfaces extend along the length of the member, the first and second bearing surfaces being mutually opposed and the third and fourth bearing surfaces being mutually opposed, one end of the member being suitable for having said device connected thereto, a housing within which part of the member is housed, and bearing means mounted inside the housing for supporting the member for movement in the direction of its length with respect to the housing, the bearing means being in abutting contact with said member at each of first, second, third, fourth and fifth positions in each of two planes, which planes are spaced apart in, and are transverse to, the direction of the length of the member, the first and second positions being spaced apart on the first bearing surface, the third position being on the second bearing surface and the fourth and fifth positions being on respective ones of the third and fourth bearing surfaces.

Preferably, the said fourth and fifth positions are each situated in the region of a plane which is midway between the first and second bearing surfaces.

The said bearing means may comprise, for each of said two planes, a set of five discrete bearing elements, for example circulating roller bearing shoes, which are supported by said housing and which are in abutting contact with the said member at respective ones of the said first, second, third, fourth and fifth positions.

Advantageously, the first, second and third positions are substantially at the points of an isosceles triangle lying in the associated plane. The distance between the said two planes can be optimised to give minimum deflection of the said one end of the member in response to a given transverse force acting on said end. Alternatively, the said distance can be optimised to be the shortest distance which will give a deflection of the said one end of the member in response to a given transverse force acting on said end, which deflection is less than about 5% greater than the minimum possible value of said deflection obtainable by varying said distance.

The said housing may comprise a first part having portions defining an open-ended channel within the part, and a second part which is removably attached to the first part so as to cover the mouth of the channel, the said bearing means comprising, for each of said two planes, a set of five discrete bearing elements of which two are mounted on the floor of said channel, another two are mounted on respective ones of the two sides of the channel substantially midway between the floor and the mouth thereof, and the last one is mounted on said second part.

Alternatively, the said housing can comprise four walls of which the respective internal surfaces bound an elongate space of square cross-section, the said bearing means comprising, for each of said two planes, a set of five discrete bearing elements which are within said space and of which two are disposed on one of said walls, a third is disposed on the wall which is opposite the said one wall, and the fourth and fifth are disposed on respective ones of the other two walls midway between the said one wall and the wall opposite the said one wall.

Advantageously, said elongate member has a square internal cross-section and said housing has a square internal cross-section.

Figure 1:
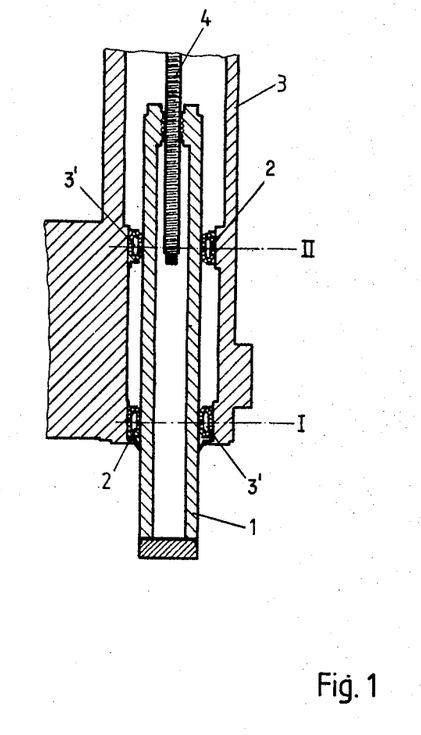
FIG. 1 is a sectional elevation of part of a spark erosion machine tool head comprising a tool holding member and bearing assembly therefor.

In FIG. 1, a tool holding member 1 is supported and guided by bearing elements 2 in a housing 3. There are two groups of bearing elements 2, each group being positioned in a respective one of two bearing planes I and II and the bearing elements of each group being distributed around the member 3 as will be described later. Each bearing element is formed as a circulating roller bearing shoe, such a bearing comprises a roller circulation housing which here comprises a fixed member attached to the inside of the housing 3 and having portions defining a track for a plurality of needles or rollers, and a core 3' around which the needles, or rollers, can run (FIG. 1). In cross-section, as shown in FIG. 1, the track has a form comprising two semi-circular ends joined by two straight sides, i.e. like a standard 400 meters atheletics race track. A plurality of needles are confined on the track. Along the length of one of the straight sides, the needles or rollers are in rolling contact with the member 1. Along the length of the other straight side, the needles are in rolling contact with housing 3. Thus, as the member 1 moves in relation to the housing 3, downwardly - in the position shown in FIG. 1, an individual needle or roller which has just come into contact with the member 1, that is at the top of that side of the track which is nearest the member 1, will roll down adjacent member 1 at that side of the track and then around so that it comes out of contact with the member 1, and then move up the other side of the track adjacent housing 2, and around again so that it comes back and again into contact with the member 1 like a runner around the aforementioned 400 meter track.

The lower end of the member 1 is outside the housing 3 and is adapted for having secured thereto a tool for performing the actual erosion machining. The other end of the member 1 comprises a screwthreaded bore wherein there is engaged a rotatable screw-threaded drive spindle 4. By rotating the spindle 4, the member 1 is moved up or down, i.e. in the direction of its length, in relation to the housing 3. The spindle 4 could of course be replaced by any other suitable drive means, for example a hydraulic drive (not shown).

Figure 2A:
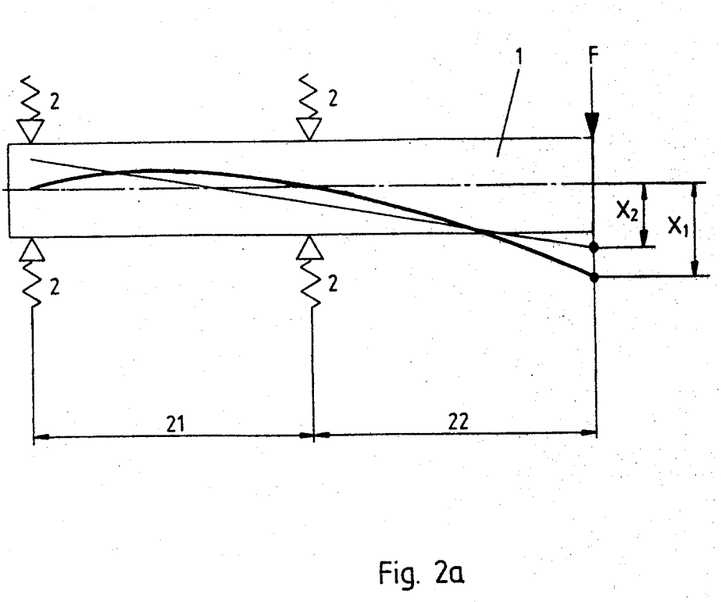
FIG. 2a is a diagrammatic illustration of a tool holding member showing the deformation which such a member undergoes due to transverse forces applied to one end thereof.
Figure 2B:
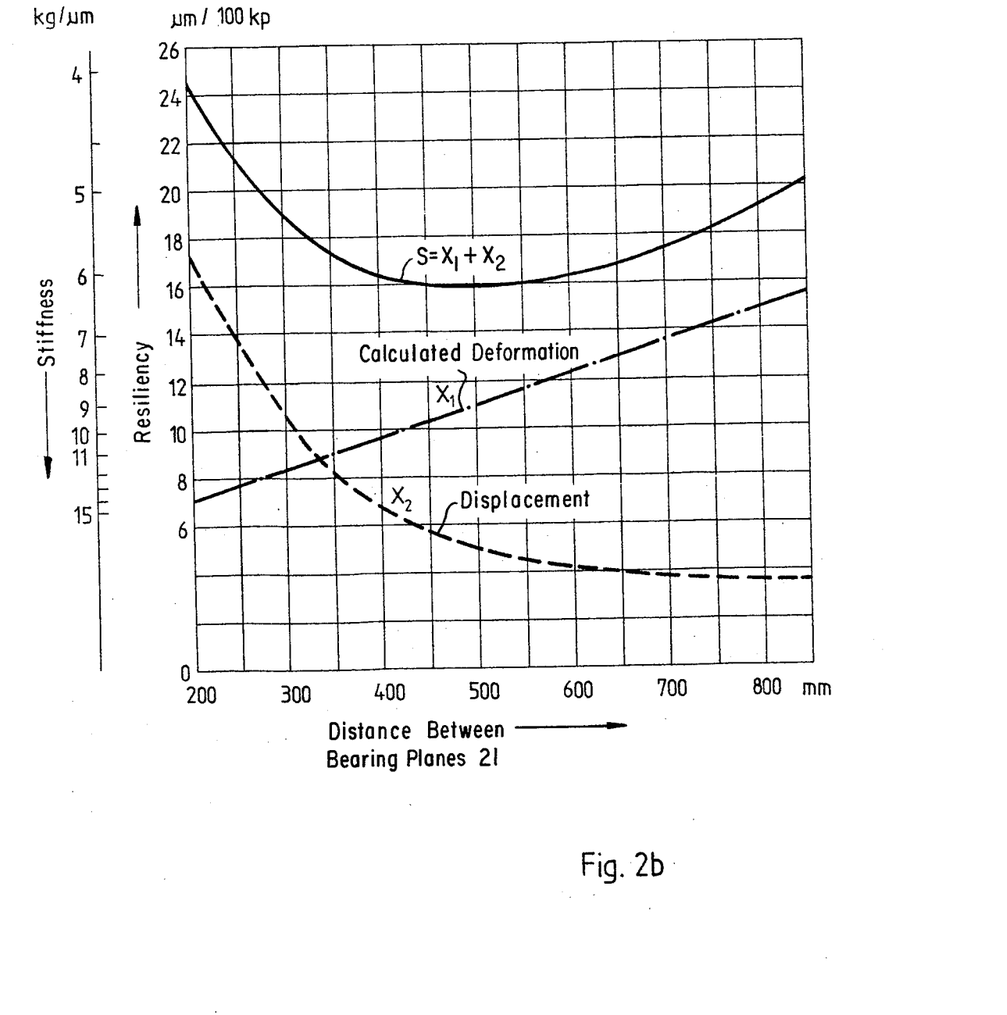
FIG. 2b is a graphic illustration of the variations of rigidity and deformation in the case of different distances between bearings.
Figure 3:
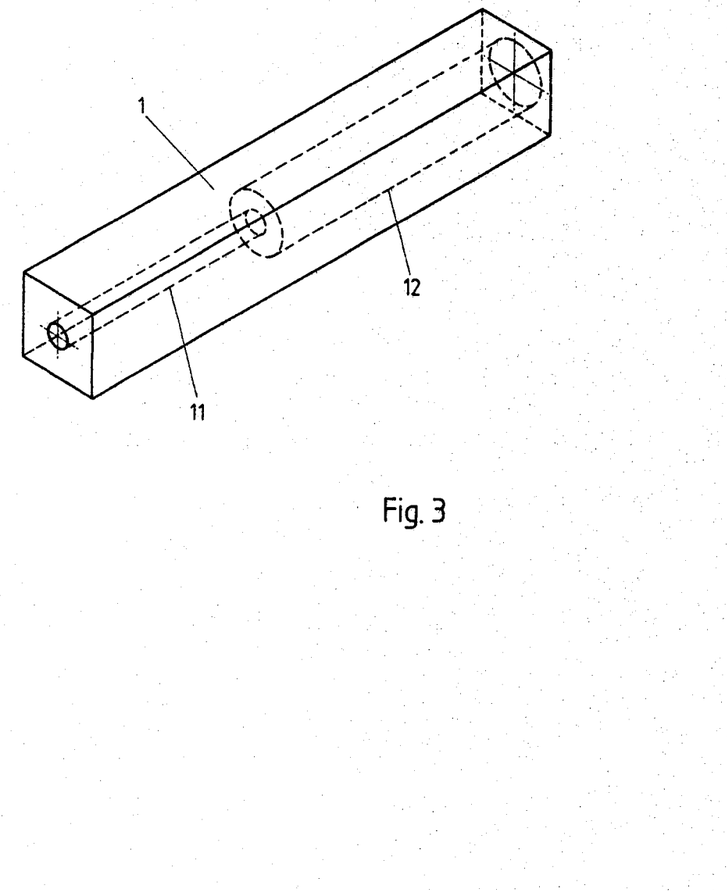
FIG. 3 is a diagrammatic perspective view of a tool holding member.

As may be seen, the positions of the two bearing planes I and II in relation to the housing 3, and the distance between those two bearing planes, remain fixed. Thus, it is possible, as shown in FIG. 2a, to design the holder so that the distance 21 between the two planes in which there are bearing elements 2 in abutting contact with the member 1 is optimised to give maximum resistance to transverse force F acting on the outer end of the member 1 at the maximum projection 22 of the member 1. Only the loading by transverse forces is taken into consideration here, because the stress with which the member 1 is loaded in the forward feed direction by the eroding operation is allowed for by the servo-control system controlling the forward feed of the member. The transverse stresses arise during the machining operation itself due to transversely acting forces of the flushing fluid. They are particularly severe in the case of forced flushing due to the displacement forces of the dielectric flushing liquid in a direction away from the engraving position, especially if a transverse eroding apparatus is employed. The bearings 2 are represented as springs in FIG. 2a because, when the member 1 is transversely loaded by a force F (FIG. 2a), one of the effects which contribute to the resulting transverse deformation of the end of the member is an elastic deformation of the bearings. In addition, there is the possibility of play or backlash in the bearings, particularly when the direction of the force F is reversed, and also the possibility that the member 1 might bend. The optimisation of the distance between the bearings 21 by a calculation is therefore initially effected with due regard to the displacement of the member 1 due to the summed effects of play and elasticity, which displacement is denoted by X2, and then in addition with due regard to the bending X1 of the tool holding member 1 in different planes, which arises from the transverse force F, if the internal machining is not uniform. FIG. 2b is a graph in which the calculated deformation X1 and displacement X2 are plotted against different values of the distance between the two bearing planes, and in which the curve S forms the sum of the two quantities X1 and X2 plotted against said distance values. The graph covers the selectable extent of the distance between bearings 21. The distance between the bearing planes may be chosen to give a minimum sum deformation according to curve S but where possible the distance is preferably chosen so as to give a value of S reasonably close to its minimum while obtaining, for constructional reasons, the smallest possible value of the distance between the bearings. For example, the distance can be the smallest which will give a value of S not more than about 5% greater than its minimum value. The example illustrated in FIG. 2b, is based on a tool holding member having a cross-section of 135mm by 135mm. The bore of this member has a diameter of 85 mm and is not necked down as is shown in FIG. 3, i.e. it has a bore of equal diameter over its entire length. The bearings 2 used have a rigidity or stiffness $K = 80$ kg/$\mu$m.

The calculation is facilitated by the fact that the member 1 has a square cross-section because clear bearing conditions unaffected by transverse actions are thus present for the main bending axes. The bending over the diagonals can be disregarded in view of the fact that the relevant resistance moment of the member 1 is substantially greater, i.e. because movement in the direction of the diagonal axes of the member is much smaller, for a given force, than it is in the directions perpendicular to the main surfaces of the member.

FIG. 3 shows a square tool holding member 1 having a stepped internal bore 11, 12, which shows how the member may in some cases have a variable resistance moment over its bending line. The different states of the internal machining are generally necessary for the coupling of the feed mechanism at one end of the member and for creating space at the other end of the member, for example to facilitate the attachment of accessories or the insulated securing of a flange carrying an accessory.

Figure 4:
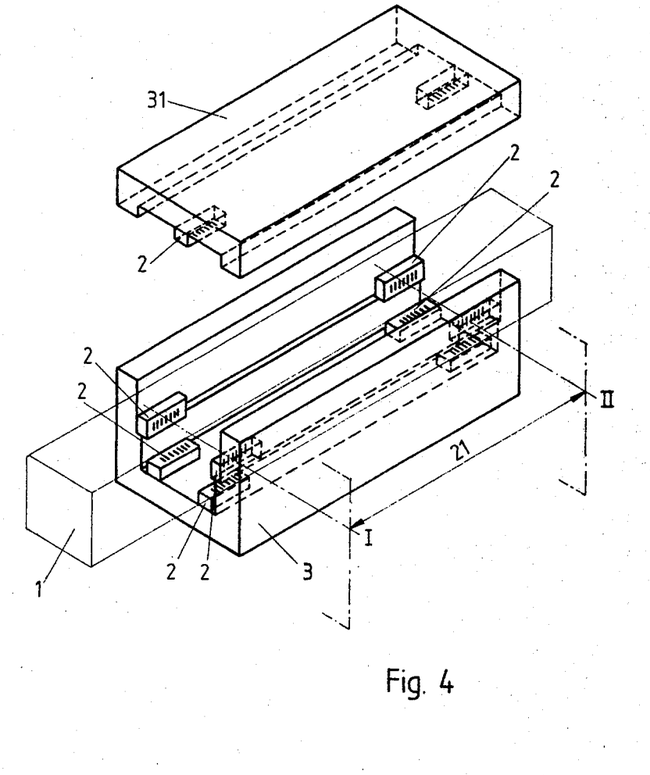
FIG. 4 is a perspective view of a housing for receiving the holding member of FIG. 3, and FIGS. 5a and 5b are two diagrams showing examples of how discrete bearing elements may be arranged in a bearing plane to support a tool holding member.

FIG. 4 shows a housing 3 for the bearings 2 and a member 1 such as that shown in FIG. 3. The member 1 is diagrammatically represented in FIG. 4 to show how it is housed in the housing 3. The two bearing planes are again denoted by I and II and will later be discussed in detail with reference to FIG. 5. The housing comprises a member having a base and two side walls defining an open-ended channel of which the mouth can be closed by a top cover 31 after the introduction of the member 1. Circulating roller bearing shoes are attached to the base and side walls of the channel-shaped member and to the inside surface of the cover 31. Those of the bearings 2 which are attached to the side walls sit upon ledges formed in respective ones of these walls as shown. The manner in which the bearings 2 are attached to the housing may also be taken into consideration during the calculation of the optimum bearing spacing 21 in the elasticity of the bearing point.

For mechanical machining, the illustrated design is advantageous, because the openable housing affords good access for substantially all mechanical machining operations and because, for example, fine grinding is also possible for producing good machining tolerances. The internal machining may be limited to the zones for receiving the bearing planes, so that the faces to be worked remain relatively small. The housing configuration is at the same time particularly rigid in the longitudinal direction owing to its height, which is determined on the basis of the bearing spacing and the length of stroke of the member 1. The feed mechanism for the member 1 may be flanged-on to the housing and the housing is suitable for being easily attached to the body of the machine tool. The top cover 31, which is fixed in the closed position after the fitting of the member 1 by means of screws (not shown) serves to prevent the walls of the housing 3 from splaying out when the bearings 2 are preloaded, and to impart a smooth-surfaced, aesthetic external apearance to the tool head.

Figure 5A:
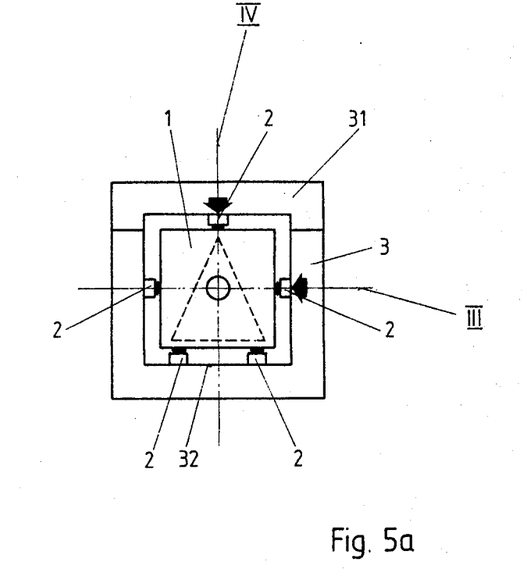
Figure 5B:
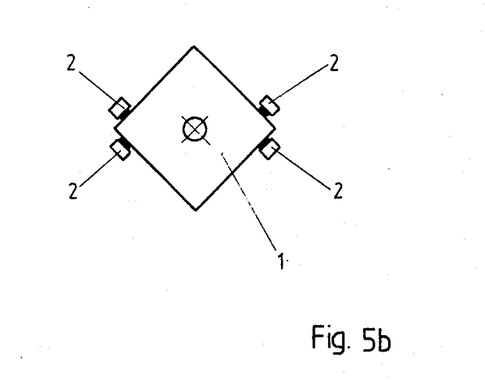

FIG. 5a shows a section through one of the bearing planes I and II in which the housing 3 with its top cover 31 can be seen around the square holding member 1 and in which the guiding of the latter by the five roller circulation shoes 2 is shown. The minimum possible number of bearing shoes 2 for a geometrically clearly defined and torsion-resistant guiding of the member 1 is four, the shoes then being positioned as shown in FIG. 5b. However, an arrangement such as this results in a greatly varying deformation behaviour under transverse loading on different axes.

The arrangement shown in FIG. 5a has a substantially more uniform deformation bahaviour on the two main axes and, in addition, it facilitates the use of the housing construction shown in FIG. 4, i.e. a channel-shaped part with a top cover 31. As shown, the holding member 1 is pressed unto the bearings 2 secured to the base of the channel-shaped housing 3 by the bearing 2 secured to the cover 31. These bearings secured to the base of the housing and the bearings secured to the top cover are positioned at the points of an equilateral triangle. As a result, the two bearings secured to the base of the housing provide the main geometrical guiding of the member 1 and resistance to torsion, the bearing fixed to the top cover on the other hand serving merely to maintain the member 1 pressed against the other two bearings and hence not needing to be positioned with any great accuracy. The bearings attached to the respective side walls of the housing are positioned so as to be intersected by a plane III which contains the longitudinal central axis of the member 1 and which is parallel to the base of the housing. With these positions of these two bearings, they are disposed in a relatively rigid zone of the housing body and they may at the same time also take up a certain proportion of torsional forces.

As an alternative (not shown) to the housing construction of FIGS. 4 and 5a, the housing 3 may comprise a one-piece member of square cross-section with a square hole therethrough, i.e. so that the cross-sectional shape of the housing remains as shown in FIG. 5a but the top wall is in one piece with the rest of the housing and does not comprise a removable cover member. The positions of the bearings 2 can remain the same as is shown in the Figure.

A tool head unit constructed as described and shown in FIGS. 1 to 5a of the drawings can be used in any spatial orientation, i.e. it does not have to be an up and down movement of the holding member 1 which is concerned.

The unit will preferably be constructed so that the stroke of the holding member 1, i.e. the distance which the member 1 can move in relation to the housing 3, is sufficiently great that it is never or at least rarely necessary, during any machining operation, to make use of any coarse adjustment mechanism of the machine tool, i.e. some mechanism which for example moves the whole tool head in the direction of the length of the member 1, and hence so that all the required movement of the tool in relation to the workpiece can be taken care of by the feed mechanism which moves the member 1 in relation to the housing.

Preferably, the head unit does not comprise any hydrostatic or pneumatic bearings for the member 1, the required accuracy being obtained solely by the use of bearings such as those illustrated and the constructional and running costs of the machine tool hence being reduced.

It will be appreciated that the invention is not just applicable to a tool holder for a spark erosion machine tool but is instead relevant to any situation where, in a machine tool, there is required a means of holding some device such as a tool, or a centring device for example, which has to be accurately guided for linear movement.

We claim:

1. An assembly for use in a machine tool, for example a spark erosion machine tool, the assembly being for holding a device, for example, a tool element for the machine tool, the assembly comprising:

an elongate member (1) comprising portions defining first, second, third and fourth external bearing surfaces of the member, which bearing surfaces extend along the length of the member, the first and second bearing surfaces being mutually opposed and the third and fourth bearing surfaces being mutually opposed, one end of the member being suitable for having said device connected thereto, a housing (3) within which part of the member (1) is housed, and bearing means (2) mounted inside the housing (3) for supporting the member (1) for movement in the direction of its length with respect to the housing, the bearing means (2) being in abutting contact with said member at each of first, second, third, fourth and fifth positions in each of two planes (I and II), which planes are spaced apart in, and are transverse to, the direction of the length of the member, the first and second positions being spaced apart on the first bearing surface, the third position being on the second bearing surface and the fourth and fifth positions being on respective ones of the third and fourth bearing surfaces.

2. An assembly according to claim 1, wherein the said fourth and fifth positions are each situated in the region of a third plane(III)which is midway between the first and second bearing surfaces.

3. An assembly according to claim 1, wherein said bearing means comprises, for each of said two planes (I and II), a set of five discrete bearing elements (2) which are supported by said housing and which are in abutting contact with the said member at respective ones of the said first, second, third, fourth and fifth positions.

4. An assembly according to claim 3, wherein each said bearing element comprises a circulating roller bearing shoe.

5. An assembly according to claim 1, wherein the first, second and third positions are at the points of an isosceles triangle lying in the associated plane.

6. An assembly according to claim 1, wherein the distance between the said two planes (I and II) is selected to give minimum deflection of the said one end of the member in response to a given transverse force acting on said end.

7. An assembly according to claim 1, wherein the distance between the said two planes is selected to be that distance which will give a deflection of the said one end of the member in response to a given transverse force acting on said end, which is less than about 5% greater than the minimum possible value of said deflection upon varying said distance.

8. An assembly according to claim 1, wherein the housing comprises a first part (3) having portions defining an open-ended channel within the part, and a second part (31) which is removably attached to the first part so as to cover the mouth of the channel, the said bearing means comprising, for each of said two planes (I and II), a set of five discrete bearing elements (2) of which two are mounted on the floor of said channel, another two are mounted on respective ones of the two sides of the channel substantially midway between the floor and the mouth thereof, and the last one is mounted on said second part (31).

9. An assembly according to claim 1, wherein said housing comprises four walls of which the respective internal surfaces bound an elongate space of square cross-section, the said bearing means comprising, for each of said two planes (I and II), a set of five discrete bearing elements which are within said space and of which two are disposed on one of said walls, a third is disposed on the wall which is opposite the said one wall, and the fourth and fifth are disposed on respective ones of the other two walls midway between the said one wall and the wall opposite the said one wall.

10. An assembly according to claim 1, wherein said elongate member has a square external cross-section and said housing has a square internal cross-section.

* * * * *